March 1, 1938. H. P. ARNOLD 2,109,717
ELASTIC POWER TRANSMISSION BELT
Filed May 1, 1936 2 Sheets-Sheet 1
Fig.1.
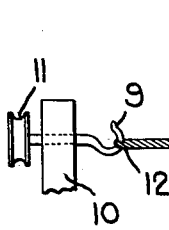
Fig.2.
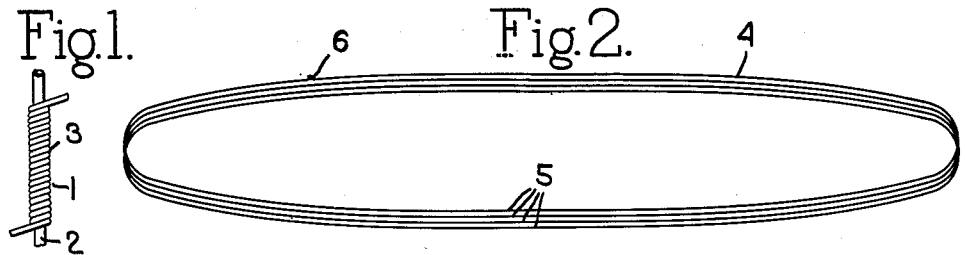
Fig.3.
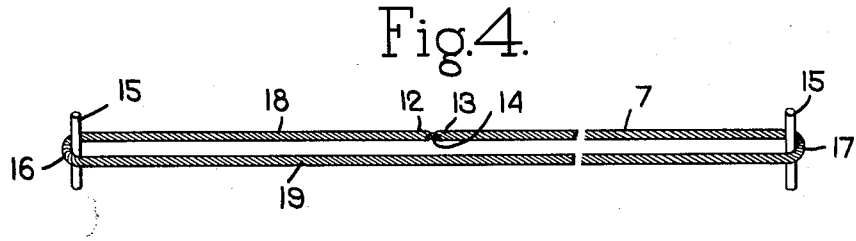
Fig.4.
Fig.5.
Fig.6.
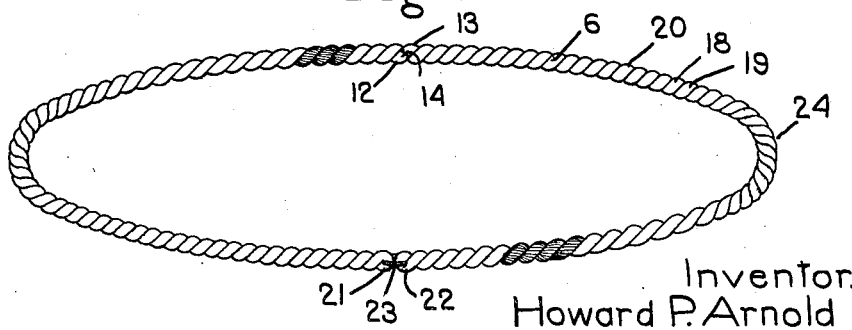
Inventor.
Howard P. Arnold
by Heard Smith & Tennant.
Attys.

March 1, 1938. H. P. ARNOLD 2,109,717
ELASTIC POWER TRANSMISSION BELT
Filed May 1, 1936 2 Sheets-Sheet 2
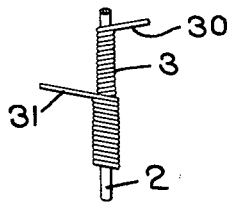
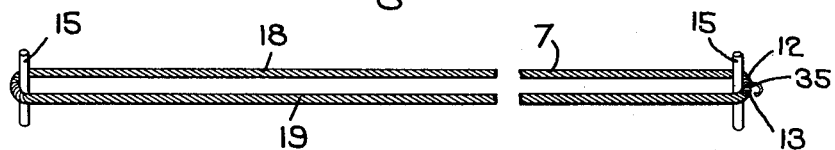
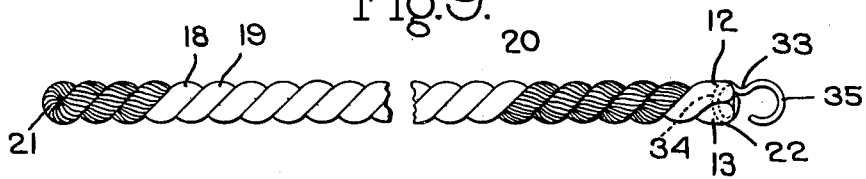
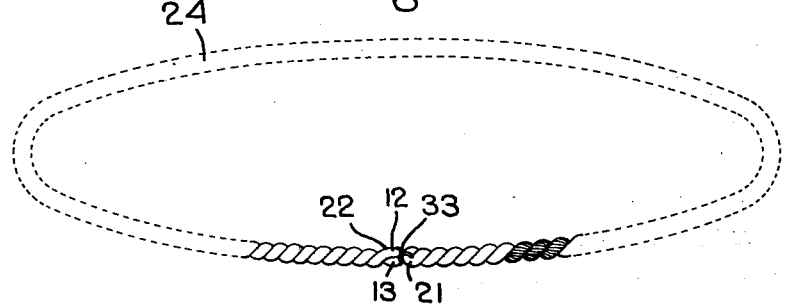
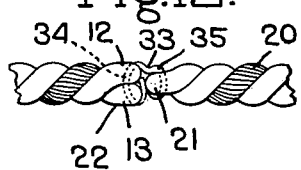
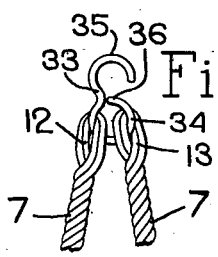
Inventor.
Howard P. Arnold
by Heard Smith & Tennant
Attys.

Patented Mar. 1, 1938

2,109,717

UNITED STATES PATENT OFFICE 2,109,717

ELASTIC POWER TRANSMISSION BELT

Howard P. Arnold, Rockland, Mass.

Application May 1, 1936, Serial No. 77,351

1 Claim. (Cl. 28—1)

This invention relates to an elastic power transmission belt formed by joining together the ends of a length of belt material, and one object of the invention is to provide an improved elastic belt, and another object to provide an improved method of making the belt.

The length of belt material from which my improved belt is made comprises two elastic cords, each cord formed of a plurality of covered elastic strands twisted together, which cords are twisted together and are connected at the ends of the length, the two twisted-together cords being held in equilibrium or in their twisted-together relation by the tendency of the individual cords to untwist.

In the drawings, Fig. 1 is a fragmentary view of a covered elastic strand which may be used in making the improved transmission belt.

Fig. 2 shows the first step in the process of making the belt, that is, the formation of a coil from this elastic strand.

Fig. 3 shows the step of twisting the coil to form a twisted cord.

Fig. 4 shows the preliminary step of forming the twisted cord into a length of band or belt material.

Fig. 5 is a fragmentary view of a length of band material from which the complete power transmission band is made.

Fig. 6 is a perspective view showing the transmission band.

Fig. 7 is a view similar to Fig. 1 but showing an elastic strand having a two-ply covering.

Fig. 8 is a figure similar to Fig. 4 but showing a different embodiment of the invention.

Fig. 9 shows the length of belt material made from the cord illustrated in Fig. 8.

Fig. 10 shows a transmission band formed from the length of belt material shown in Fig. 9.

Fig. 11 is a fragmentary view illustrating a fastening device by which the ends of the cord are fastened together and also the ends of the length of belt material.

Fig. 12 is a fragmentary view on a larger scale showing the two ends 21, 22 of a length 20 of belt material fastened together.

In making my improved band I employ an elastic strand 1, such as shown in either Fig. 1 or Fig. 7, and which comprises a core member 2 of rubber or other elastic material and a covering 3 of thread, yarn or similar fibrous material which is wound about the core. The covering 3 of thread, yarn or similar fibrous material may be a singly-ply covering, as shown in Fig. 1, or a plural-ply covering, as shown in Fig. 7. In the construction shown in Fig. 1 the covering 3 is made by a single thread 30 which is wound about the cord 2.

In Fig. 7 I have shown a two-ply covering which is formed by first winding a thread 30 about the core 2 in one direction to form the first ply of the covering, and then winding a second thread 31 around the covered core in the opposite direction to form the second ply of the covering. Elastic strands with additional plies in the covering may be used if desired.

The first step in the manufacture of the belt is to form a coil 4 of this covered elastic strand, the strand being laid in coil formation as shown in Fig. 2 with as many turns or plies 5 in the coil as is desired for the size of belt to be made. There may be any number of turns in this coil and for a small belt a coil having relatively few turns, say eight or ten, will suffice, while for a larger belt the coil will be made with a greater number of turns, say twenty or thirty. After the coil 4 has been made with the requisite number of turns 5 then the ends of the strand 1 are knotted or fastened together as shown in 6. The coil is then twisted to produce a twisted cord 7, and to do this the coil is placed over an anchoring hook 8, and then the opposite portion of the coil is placed over a rotary hook member 9 which is shown as rotatably mounted in a suitable support 10 and is provided with a suitable pulley 11 by which it may be rotated. The rotation of the hook 9 twists the two sides of the coil together and thus produces a twisted cord-like element 7. The twisting operation is carried far enough to produce a relatively hard twist in the cord 7, and during this operation said cord is held under sufficient tension so that it will not kink because of the twist which is given to it. After the cord has been given the desired amount of twist it is then removed from the twisting apparatus, and while still held under sufficient tension to prevent it from kinking the cord is doubled and the ends 12 and 13 are fastened together by some suitable fastening device, thereby producing a two-ply cord having one-half the length of the cord 7 as it was removed from the twisting apparatus. One way of connecting the two ends 12 and 13 of the twisted cord is shown in Fig. 4 wherein said ends 12 and 13 are connected by a fastening device 14, and the doubling operation is performed in such a way that the connected ends 12, 13 will be located intermediate of the ends of the doubled element so that the two ends 16, 17 of the doubled cord are in the form of loops, and the two plies or sections of the double cord are thus integrally connected at each end.

In Fig. 4 the twisted cord 7 is shown as passed around retaining members 15 and as having the ends 12 and 13 connected together by the fastening device 14, the retaining members 15 serving to hold the cord from kinking due to the twist therein.

The fastening device 14 may be a wire or a thread or small cord which is threaded through the openings in the ends of the twisted cord 7 which were occupied by the hooks 8, 9. After the ends 12, 13 of the cord 7 have been fastened together and the cord has been doubled as shown in Fig. 4, then the doubled cord is released at one or both ends, and the tendency of each of the two sections 18, 19 to untwist will cause said sections to twist together to produce the twisted belt member 20 shown in Fig. 5. This twisting together of the two sections 18, 19 will continue until the belt material reaches a state of equilibrium in which the tendency of each of the separate sections 18 and 19 to untwist is counterbalanced by the tendency of the twisted belt element 20 to untwist.

There is, therefore, provided an elastic belt element 20 comprising the two sections 18 and 19 twisted together, which sections are integrally connected at the ends 21 and 22 of the length 20 of belt material. Furthermore each of the sections or cord elements 18, 19, which being twisted together form the length 20 of belt material, is composed of a plurality of elastic strands twisted together.

After the length 20 of belt material has been thus formed the ends 21, 22 thereof are fastened together by a suitable fastening 23, thereby forming an elastic belt or band 24 adapted for power transmission purposes. The fastening device 23 may be of any suitable type such as a wire or a thread or cord my which the ends 21, 22 are tied together.

In Figs. 8 to 11 I have shown a different embodiment of the invention wherein the fastening device by which the ends 12, 13 of the cord 7 are fastened also constitutes the fastening means by which the ends 21, 22 of the length 20 of belt material are fastened together.

This fastening device is indicated at 33 and it is preferably made of wire and comprises the loop portion 34 by which the ends 12, 13 are fastened together, and the hook portion 35 by which the ends 21, 22 are fastened together.

In making the belt in accordance with what is shown in Figs. 8 to 11 the cord 7 is doubled so that the two ends 12, 13 will be located at the end of the double cord, as shown in Fig. 8. These ends 12, 13 are fastened together by the loop portion 34 of the fastening device 33 in the same manner that the ends 12 and 13 are fastened together by the fastening device 14. The fastening device 33 is made, in the first instance, with the loop portion 34 partly open, and the end 36 of the loop is threaded through the openings in the ends 12, 13 of the twisted cord 7 which were occupied by the hooks 8 and 9. The loop 34 may then be closed, if desired, to retain each end of the cord 7 in said loop. With this arrangement the fastening device 33 will be located at the end of the double cord, and when the double cord is released to allow the two sections 18 and 19 thereof to twist together a length 20 of belt material is provided with the hook portion 35 of the fastening device projecting from one end 22 thereof. The belt is completed by merely hooking the hook 35 into the loop at the end 21 of the belt material.

Since the two cord members 18 and 19 which are twisted together to form the belt material 20 are in themselves formed of elastic strands twisted together, the resulting belt will be an elastic belt which is admirably adapted for various power transmitting purposes and especially for use in machines where the belt-driven member is running at a high speed.

A transmission band embodying this invention is very flexible and because of its elastic characteristics it will always be tight on the pulley. A belt having this construction will rotate a driven member at high speed with less expenditure of power than belts now commonly used for this purpose.

I claim:

The method of making a power transmission band which consists in forming a single continuous strand having an elastic core and a covering of fibrous material into a coil having a multiplicity of parallel contiguous turns, fastening the ends of the length of the strand together, forming the coil into an elongated loop, twisting together the two sides of the loop to form a relatively hard twisted cord, doubling the hard twisted cord and connecting the ends together while maintaining the cord under sufficient tension to prevent it from kinking due to the twist therein, releasing one end of the doubled cord whereby the two cord members become twisted together by the tendency of each cord member to untwist and a length of two-ply twisted belt material is produced which is held in a state of equilibrium due to the tendency of the twisted length of belt material to untwist being counterbalanced by the tendency of the individual cord members to untwist, and then connecting together the two ends of the length of two-ply twisted belt material.

HOWARD P. ARNOLD.